May 19, 1925.  
C. P. RENEAU  
1,538,746  
PLUMB BOB  
Filed April 27, 1923
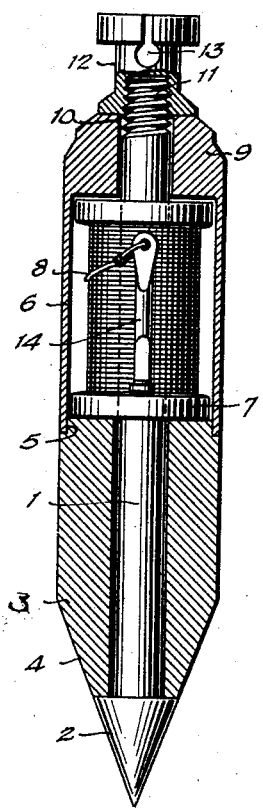
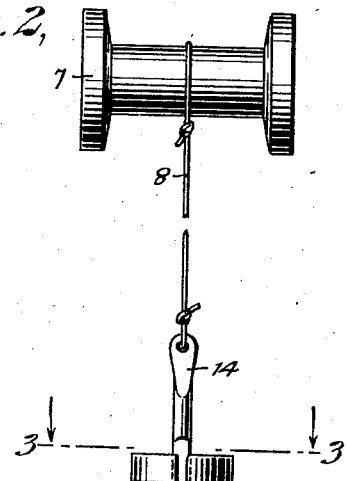
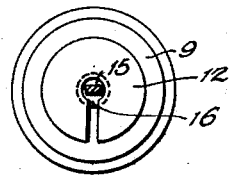
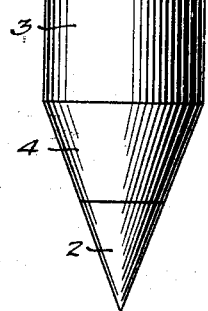
WITNESSES  
Edw. Thorpe  
Robert I. Hulsizer
INVENTOR  
Charles Powell Reneau  
BY  
Munn & Co  
ATTORNEYS Patented May 19, 1925.

1,538,746

UNITED STATES PATENT OFFICE.

CHARLES POWELL RENEAU, OF TUNICA, MISSISSIPPI.

PLUMB BOB.

Application filed April 27, 1923. Serial No. 635,121.

*To all whom it may concern:*

Be it known that I, CHARLES POWELL RENEAU, a citizen of the United States, and a resident of Tunica, in the county of Tunica and State of Mississippi, have invented a new and Improved Plumb Bob, of which the following is a full, clear, and exact description.

This invention relates to a new and improved plumb bob construction, and has for an object the provision of means whereby a plumb bob and a spool on which the line is normally wound can be mounted compactly when not in use in the form of an enclosed unit capable of being readily stowed away in small space.

Plumb bobs are generally used by people who carry them as part of other equipment in a tool box or in a container with other implements or tools, and when the plumb bob and the plumb line mounted on the spool are carried separately it is oftentimes inconvenient to find them, and especially is it true that the line is very likely to become entangled with the other implements and snarl. It is very convenient to have the line-supporting spool constantly associated with the bob itself so that when the bob is to be used the line will always be handy. It is still more convenient to form the bob and the line-supporting spool as a compact unit, with the parts always held together, and preferably enclosed when not in use.

To this end, the invention is illustrated in the drawings, of which—

Figure 1 is a sectional view of the bob and the reel and line in their assembled position when the bob is not in use;

Fig. 2 is an elevation showing the bob in use and a part of its casing cut away;

Fig. 3 is a section on the line 3—3 of Fig. 2; and

Fig. 4 is a partial elevation of the swivel link which connects the plumb line and the bob.

The form of the invention shown in the drawings is a preferred form, although it is understood that modifications in the construction and arrangement of the parts and in the character of the materials used may be adopted without departing from the spirit of the invention.

The preferred form of the invention shown in the drawings includes a plumb bob stem 1 having a head 2, preferably tapered to a point. Removably or slidably mounted around this stem and supported on the head is a weight or bob portion 3 having a central bore through which the stem 1 extends. This weight is preferably tapered, as at 4, in line with the taper in the head; and at its rear end the weight is provided with a shoulder 5 against which the lower end of a sleeve or shell 6 is adapted to bear. This shell 6 is hollow to receive a spool 7 on which the plumb line 8 is wound. The upper end of the shell 6 is solid, as at 9, and bored out as at 10 to receive the upper end of the stem 1. The upper end of the stem is preferably threaded as at 11 to receive the nut 12.

The upper end of the nut is provided with a key slot 13 into which the lower end of a swivel link 14 is adapted to be disposed. The lower end of this link is reduced, as at 15, and then enlarged, as at 16. The reduction 15 is only in one plane, the thickness of this reduced portion in one direction being less than its thickness in a direction at right angles thereto. The reason for this is because the head or enlarged portion 16 of the link is slipped into the enlarged portion of the key slot 13 and when in place the link is turned at right angles, so that its greatest width is presented at right angles to the slot 13, whereby the link will not slide out of the key slot 13.

The view in Fig. 1 shows the stem, the weight the shell, the spool and the nut already assembled to form a compact unit which can be tossed into a tool box without any liability of the various parts being scattered through the box or lost. In this position the spool is held securely within the shell and the shell is held firmly on the weight by reason of the clamping nut 11.

To remove the spool, it is merely necessary to unscrew the nut, remove the shell and then slip the spool off the stem, whereupon the shell can be slipped back into place and the nut clamped on again. To attach the line to the bob, the swivel link is inserted in the key slot and turned to prevent its slipping out.

The bob can, of course, also be used without the shell being in place. It is merely necessary to remove the shell and then screw the nut on the end of the stem to permit the use of the bob merely with the stem or head, and the weight, if desired.

It will be observed that this device is a complete unit, including all the parts necessary to constitute a complete plumb line and bob outfit so contained that all the parts are enclosed when not in use to prevent them from being lost or destroyed.

What I claim is:—

A plumb bob construction which includes a stem, a head on the lower end of said stem and threads on the upper end of said stem, a tapered bob weight slidable on the stem and supported on the head, said weight having a shoulder on its upper surface, a shell having one end closed and apertured to embrace the stem, the open end of the shell resting on the weight, a plumb-line spool slidably and removably disposed within the shell around the stem, a clamp nut engaging the threaded upper edge of the stem and bearing against the closed end of the shell to hold the shell, the spool and the weight on the stem, said nut having a key slot therein, and a swivel link attachably associated with said slot for the purpose set forth.

CHAS. POWELL RENEAU.